United States Patent [19]

Shimizu et al.

[11] Patent Number: 5,396,431
[45] Date of Patent: Mar. 7, 1995

[54] NAVIGATION SYSTEM WITH POSITION MEASURING DEVICE AND AERIAL PHOTOGRAPHIC STORAGE CAPABILITY

[75] Inventors: Toshihiko Shimizu, Tokyo; Morio Araki, Kawagoe; Takeharu Arakawa, Kawagoe; Kenichi Nobe, Kawagoe, all of Japan

[73] Assignee: Pioneer Electronic Corporation, Tokyo, Japan

[21] Appl. No.: 962,976

[22] Filed: Oct. 16, 1992

[30] Foreign Application Priority Data

Oct. 22, 1991 [JP] Japan .................................. 3-274343

[51] Int. Cl.⁶ .............................................. G06F 15/50
[52] U.S. Cl. .................... 364/449; 364/460; 364/450; 340/995; 342/457
[58] Field of Search ............... 364/449, 450, 460; 340/995; 342/357, 457

[56] References Cited

U.S. PATENT DOCUMENTS

| | | | |
|---|---|---|---|
| 4,890,233 | 12/1989 | Ando et al. | 364/457 |
| 4,939,662 | 7/1990 | Nimura et al. | 364/449 |
| 4,943,925 | 7/1990 | Morato et al. | 364/449 |
| 4,954,959 | 9/1990 | Moroto et al. | 364/449 |
| 4,992,947 | 2/1991 | Nimura et al. | 364/444 |
| 5,031,104 | 7/1991 | Ikeda et al. | 364/449 |
| 5,115,398 | 5/1992 | De Jong | 364/443 |

OTHER PUBLICATIONS

Patent Abstracts of Japan vol. 11, No. 386 (P-647) 17 Dec. 1987 & JP-A-62 151 713 (Pioneer Electronic Corp.) 6 Jul. 1987 *abstract*.
Patent Abstracts of Japan vol. 13, No. 430 (P-937) 26 Sep. 1989 & JP-A-11 63 608 (Nec Home Electron Ltd) 27 Jun. 1989 *abstract*.

*Primary Examiner*—Michael Zanelli
*Attorney, Agent, or Firm*—Kane, Dalsimer, Sullivan, Kurucz, Levy, Eisele and Richard

[57] ABSTRACT

A navigation system is provided with: a position measuring device for measuring a current position of a movable body to which the navigation system is equipped; a storing device for storing aerial photograph data; a displaying device; and a display controlling device coupled to the position measuring device, the storing device, and the displaying device, for making the displaying device display a mark indicating the measured current position on an aerial photograph image on the basis of the measured current position and the stored aerial photograph data.

7 Claims, 6 Drawing Sheets

NAVIGATION SYSTEM WITH POSITION MEASURING DEVICE AND AERIAL PHOTOGRAPHIC STORAGE CAPABILITY

BACKGROUND OF THE INVENTION

1. Field of the Invention

The present invention generally relates to navigation systems for movable bodies, and more particularly to an on-vehicle navigation system by means of GPS (Global Positioning System) receiver.

2. Background of the Related Art

There is a GPS (Global Positioning System) type navigation system as one type of navigation systems for movable bodies, such as men, vehicles, aeroplanes, ships, etc., which utilizes satellites. The GPS type navigation system generally receives electric waves emitted from three or more GPS satellites, and identifies the position of the receiving point by referring to pseudo-distance data including a time offset of a receiver based on the distance between each GPS satellite and the receiving point, and position data indicating each GPS satellite. Thus, GPS measurement data are outputted.

In this type of GPS navigation system, there is a system, in which a map matching is executed between the GPS position measurement data and map data stored in a recording medium, such as CD-ROM (Compact Disk-Read Only Memory), so that the current position and the traveling direction is displayed in the map on the display unit.

In this type of GPS navigation system, the map image displayed on the display unit is formed by use of, for example, map data issued by a national geography committee. Thus, it is easy for the user to understand the current position on the map or the positions of the main roads or railway stations on the displayed map image. However, in the actual cases, if there are narrow roads which are not shown in thus formed map, or if the vehicle is located at a place where large buildings disturbs the view of the user, the actual conditions around the current position can not be easily recognized, resulting in that the basic function of the navigation system can not be fulfilled.

In order to overcome this problem, such a method may be tried, in which the information as for the actual conditions, such as detailed information indicating areas of large buildings, orchard fields etc., is stored in advance, or the information as for all of the roads including narrow ones is stored in advance. However, this method has a basic problem that the data quantity gets very large, and is not practical.

SUMMARY OF THE INVENTION

Accordingly, an object of the present invention is to provide a navigation system by which conditions around the current position can be easily recognized.

According to the present invention, the above mentioned object can be achieved by a navigation system provided with: a position measuring device for measuring a current position of a movable body to which the navigation system is equipped; a storing device for storing aerial photograph data; a displaying device; and a display controlling device coupled to the position measuring device, the storing device, and the displaying device, for making the displaying device display a mark indicating the measured current position on an aerial photograph image on the basis of the measured current position and the stored aerial photograph data.

In operation, conditions around the current position of the movable body, such as a group of buildings, agriculture fields, orchard fields etc., are displayed in the aerial photograph image, with the mark indicating the current position, on the display device. Thus, just by comparing such conditions shown in the aerial photograph image with the actual circumferences i.e. the buildings, the fields etc., around the movable body in the sight, the recognition of the current position can be easily performed.

Since, the aerial photograph data is used in the present invention, the data quantity is not so large as in the case of the aforementioned related art in which the information as for all of the narrow roads etc., are stored.

It is preferable to store the aerial photograph data to the storing device by image-reading aerial photographs by use of, for example, an image scanner, so that the data storing operation can be quite easily performed with low cost.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENTS

Figure 1:
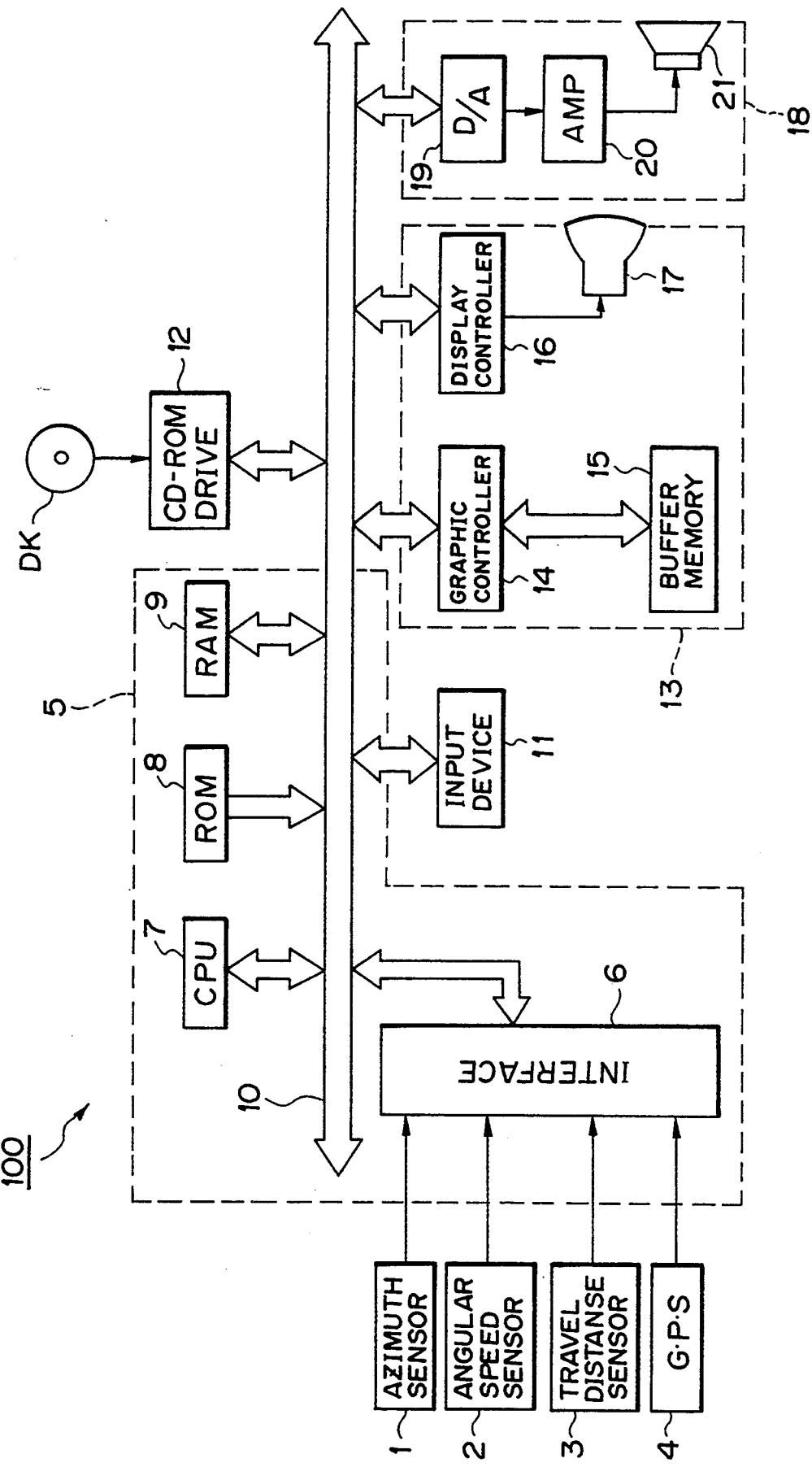
FIG. 1 is a block diagram of an embodiment of the present invention.

FIG. 1 is a block diagram of a basic structure in which the present invention is applied to an on-vehicle navigation system.

An on-vehicle navigation system 100 shown in FIG. 1 includes an azimuth sensor 1, an angular speed sensor 2, a travel distance sensor 3, a GPS receiver 4, a system controller 5, an input device 11, a CD-ROM drive 12, a display unit 13 and an acoustic reproduction unit 18. The azimuth sensor 1 generates azimuth data indicating the direction in which the vehicle is traveling. The angular speed sensor 2 detects an angular speed when the vehicle turns. The travel distance sensor 3 detects the number of revolutions of a shaft and integrates it to thereby generate travel distance data. The GPS receiver 4 receives an electric wave from a GPS satellite, and generates GPS measurement position data therefrom. The system controller 5 controls the whole navigation system on the basis of the azimuth data, the angular speed data, the travel distance data and the GPS position measurement data. The input device 11 is used for inputting various data pieces to the navigation system 100. The CD-ROM drive 12 reads various data pieces from a CD-ROM disk DK and outputs the readout data pieces to a bus line 10 under the control of the system controller 5. The display unit 13 displays various display data pieces under the control of the system controller 5. The acoustic reproduction unit 18 reproduces various audio data under the control of the system controller 5.

The system controller 5 includes an interface unit 6, a CPU 7, a ROM (Read Only Memory) 8, and a RAM (Random Access Memory) 9. The interface unit 6 establishes an interface with external devices. The CPU 7 controls the whole system controller 5. The ROM 8 stores control programs used for controlling the system controller 5. The RAM 9 includes a non-volatile memory, and stores various data segments. The system controller 5 is connected, via the bus line 10, to the input device 11, the CD-ROM drive 12, the display unit 13 and the acoustic reproduction unit 18.

The display unit 13 includes a graphic controller 14, a buffer memory 15, a display controller 16, and a display device 17. The graphic controller 14 controls the entire operation of the display unit 13 on the basis of control data supplied from the CPU 7 via the bus line 10. The buffer memory 15 is formed with, for example, a VRAM (Video RAM), and temporarily stores image information which can be soon displayed. The display device 17 is formed with, for example, a LCD (Liquid Crystal Display) or a CRT (Cathode Ray Tube). The display controller 16 controls the display device 17 on the basis of the image data output from the graphic controller 14.

The acoustic reproduction unit 18 includes a D/A (Digital-to-Analog) converter 19, an amplifier 20 and a speaker 21. The D/A converter 19 converts digital audio data supplied from the CD-ROM drive 12 or the RAM 9 via the bus line 10 into an analog audio signal. The amplifier 20 amplifies the analog audio signal output from the D/A converter 19. The speaker 12 converts the amplified audio signal into acoustic vibrations.

The structure of data stored in the CD-ROM disk DK will now be described with reference to FIGS. 2 through 4.

Figure 2:
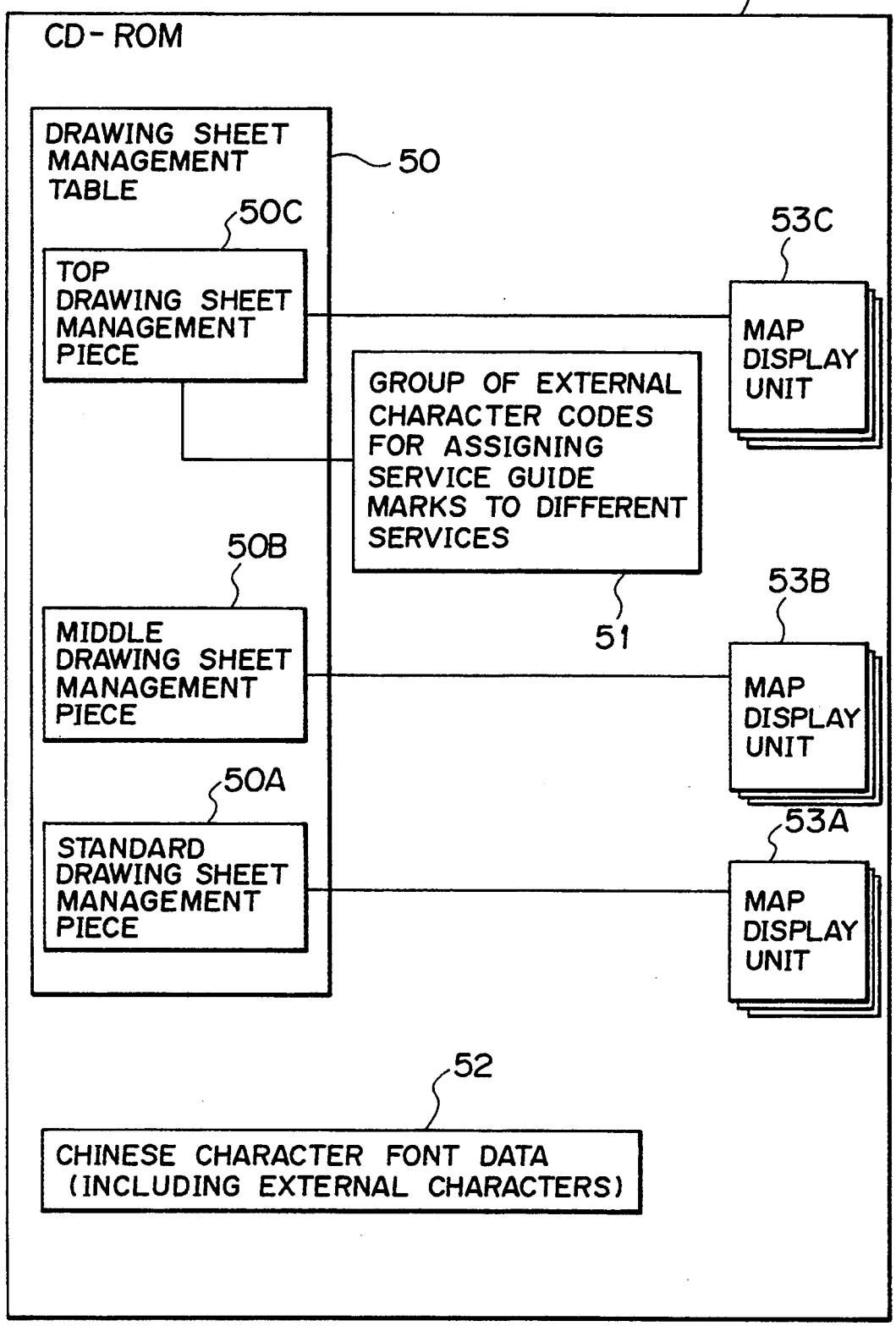
FIG. 2 is a diagram showing a state in which data is stored in a CD-ROM disk.

In FIG. 2, the CD-ROM disk DK stores a drawing sheet management table 50, a group 51 of external-character codes for assigning service guide marks to be displayed to the different contents of services provided by particular facilities, Chinese character font data 52, and map display units 53A, 53B and 53C. Examples of the contents of services of the particular facilities are Japanese food restaurants, western food restaurants, hotels, movie theaters, leisure facilities, and so on. The drawing sheet management table 50 stores data used for managing map data for use in display. The font data 52 stores data indicating fonts of displayable characters including external characters. The map display unit data pieces 53A, 53B and 53C are respectively blocks of data segments for displaying maps on the basis of the contents of the drawing sheet management table 50.

The drawing sheet management table 50 has a standard drawing sheet management piece 50A, a middle drawing sheet management piece 50B, and a top drawing sheet management piece 50C. The standard drawing sheet management piece 50A manages data on small-scale maps showing narrow areas. The middle drawing sheet management piece 50B manages data on middle-scale maps showing middle areas. The top drawing sheet management piece 50C manages data on large-scale maps showing wide areas. A plurality of map display units 53A, ..., 53A are related to the standard drawing sheet management piece 50. A plurality of map display units 53B, ..., 53B are related to the middle drawing sheet management piece 50B. A plurality of map display units 53C, ..., 53C are related to the top drawing sheet management piece 50C. The CPU 7 (in FIG. 1) refers to a plurality of map display units on the basis of the management pieces 50A, 50B and 50C, and transfers various data pieces to the RAM 9 and the buffer memory 15 in order to display the map and other information pieces.

Figure 3:
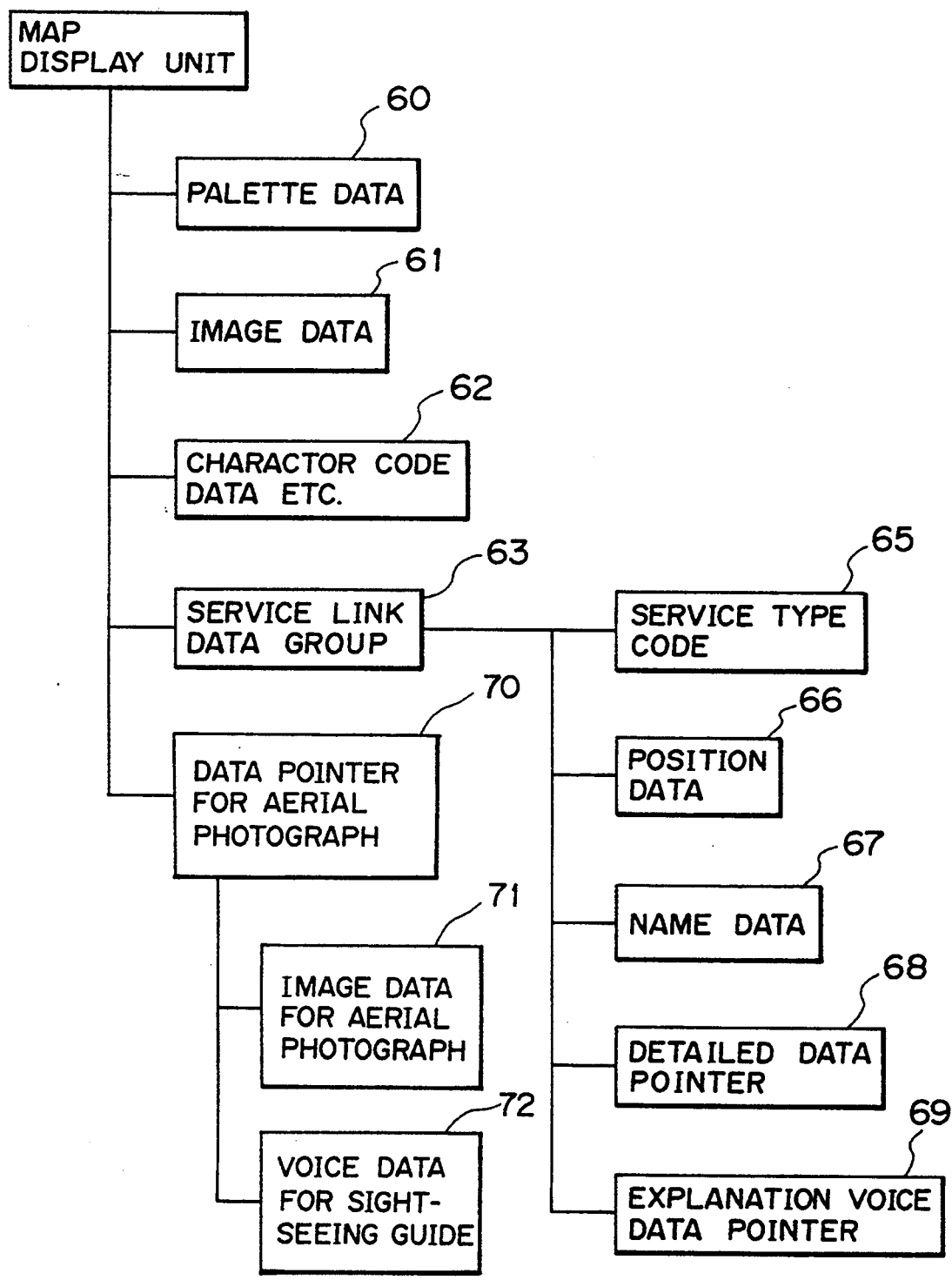
FIG. 3 is a diagram showing a state in which data is stored in the CD-ROM disk.

FIG. 3 shows the structure of each of the map display units 53A as an example of the structure of data in the map display units. The other map display units 53B and 53C are configured in the same manner as the map display units 53A. Each of the map display units 53A includes palette data 60, image data 61, character code data 62, a group 63 of pieces of service link data. The palette data 60 is color data for a colored display of map. The image data 61 forms an image of the displayed map. The character code data 62 indicates codes of characters to be displayed on the map display. The group 63 of pieces of service link data forms an address table that stores the addresses of storage areas formed on the CD-ROM disk DK in which service information segments showing the contents of services provided by the particular facilities are stored. A data pointer 70 for aerial photograph data is also stored in the map display unit 53A, which indicates the store addresses on the CD-ROM disk DK of the image data 71 for aerial photograph, and the voice data 72 for sight-seeing guide to preform the sight-seeing guide corresponding to this image data 71.

The service link data group 63 includes service type code data 65, position data 66, name data 67, a detailed data pointer 68, and an explanation voice data pointer 69. The service type code data 65 contains service type codes assigned to the different types of services provided by the particular facilities, such as leisure facilities, accommodation facilities and restaurants. The position data 66 contains data pieces respectively indicating the locations of the particular facilities. The name data 67 includes data pieces showing the names of the facilities. The detailed data pointer 68 functions as an address table showing the addresses of storage areas in the CD-ROM disk DK in which detailed information concerning the services of the facilities. The explanation voice data pointer 69 functions as an address table in which the addresses of storage areas in the CD-ROM disk DK in which voice data segments for explaining the facilities are stored.

Figure 4:
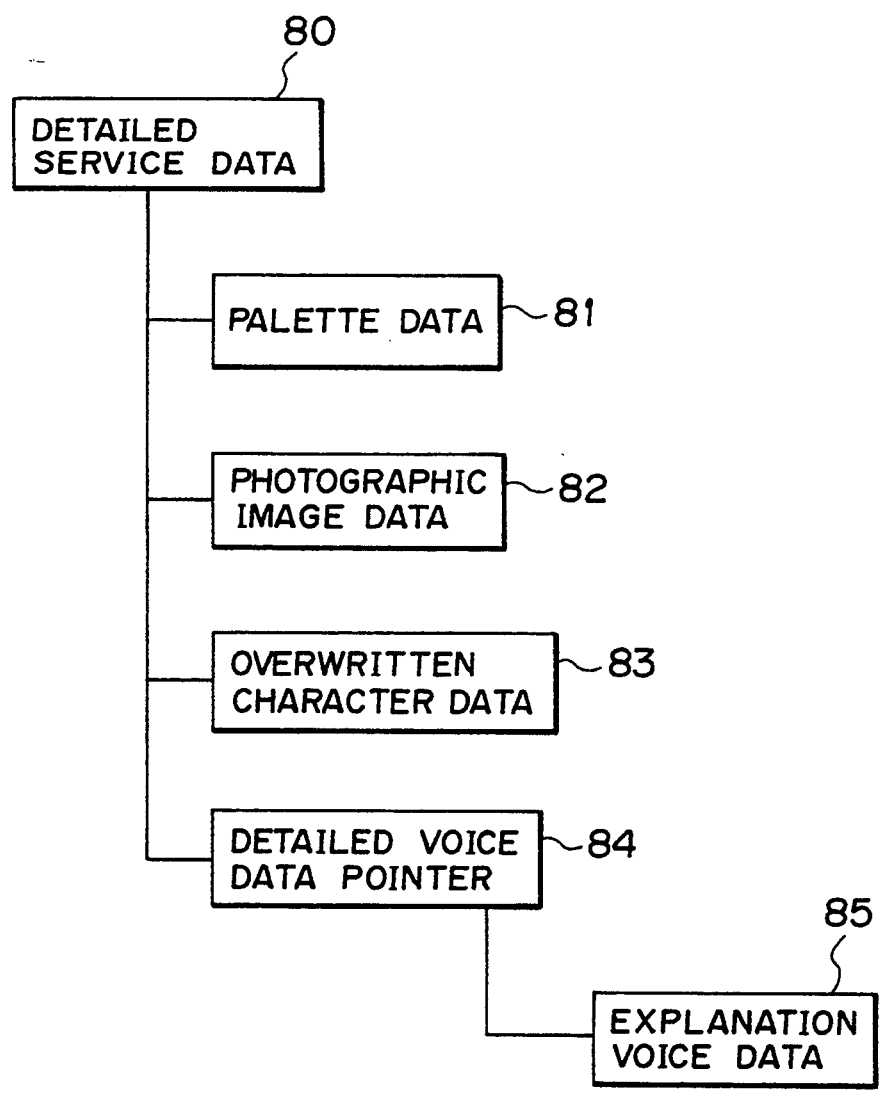
FIG. 4 is a diagram showing a state in which data is stored in the CD-ROM disk.

A storage area on the CD-ROM disk DK specified by the detailed data pointer 68 (in FIG. 3) stores detailed service data 80 for each of the facilities, as shown in FIG. 4. The detailed service data 80 contains palette data 81, photographic image data 82, overwritten character data 83, and a detailed voice data pointer 84. The palette data 81 is data indicating colors forming photograph data related to the respective facilities. The photographic image data 82 is image data that shows, for example, photographic images of the external appearance and the interior of the facilities, and photographic images of menus indicating recommended food. The overwritten character data 83 indicates characters (the name of the facility) superimposed on the picture plane of the display device 17. The detailed voice data pointer 84 indicates the address of a storage area on the CD-ROM disk DK in which explanation voice data 85 for a voice or acoustic message which explains the facility is stored.

Figure 5:
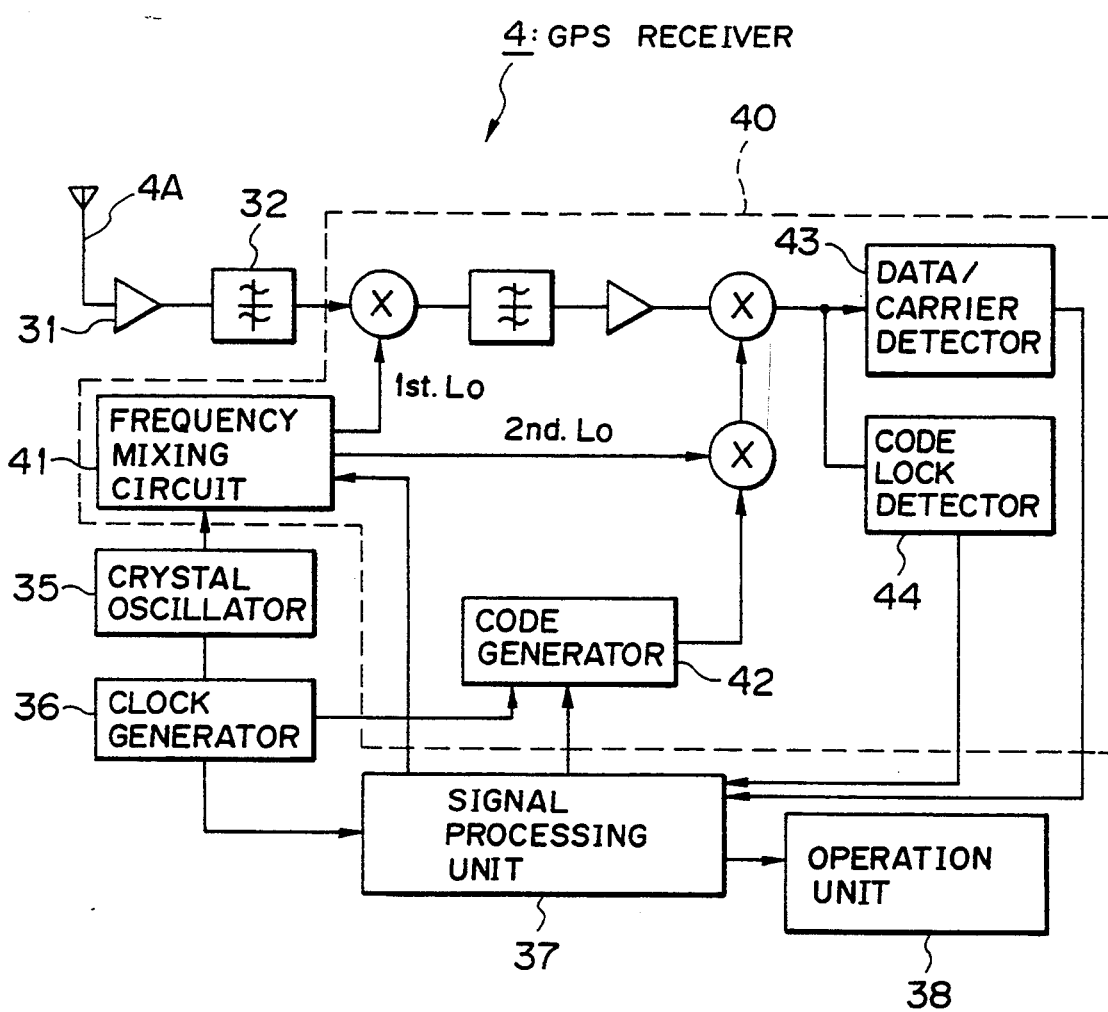
FIG. 5 is a block diagram showing the structure of a GPS receiver.

A description will now be given of the GPS receiver 4 with reference to FIG. 5. A GPS antenna 4A is coupled to a GPS receiving block 40 via a preamplifier 31 and a band-pass filter 32. A crystal oscillator 35 generates a reference frequency signal, which is a reference timing control signal of the GPS receiver 4. A clock generator 36 generates, from the reference frequency signal, a clock signal for controlling the operation timing of a signal processing unit 37. An operation unit 38 is connected to the signal processing unit 37.

The GPS receiving block 40 includes the following components. A frequency mixing circuit 41 generates a signal having the same pattern as data relating to a carrier of the GPS satellite, the position thereof, and a clock built in the GPS satellite on the basis of the reference frequency signal. A code generator 42 receives the clock signal generated by the clock generator 36, and generates a code signal having the same pattern as a distance measurement signal. A data/carrier detector 43 synchronously detects, by using the output signals of the frequency mixing circuit 41 and the code generator 42, data relating to the clock built in the GPS satellite and an orbit of the GPS satellite, and the carrier. A code lock detector 44 synchronously detects the above-mentioned distance measurement signal by using the code signal generated by the code generator 42.

A description will now be given, with reference to FIGS. 1 through 6, of the operation of the on-vehicle navigation system according to the embodiment of the present invention.

The system controller 5 in FIG. 1, receives the azimuth data, the angular speed data, the travel distance data and the GPS position measurement data via the interface unit 6, and calculates data indicating the current position in accordance with a program stored in the ROM 8. In this case, when the GPS position measurement data has a high measurement precision, the received GPS position measurement data is used as the current position data without correcting it. When the GPS position measurement data has a low measurement precision, it is corrected using the azimuth data, the angular speed data and the travel distance data, or new current position data is generated from the azimuth data, the angular speed data and the travel distance data, without the GPS position measurement data.

After the system controller 5 calculates the current position data, it drives the CD-ROM drive 12 so that various necessary data pieces are read from the CD-ROM disk DK and transferred to the RAM 9 via the bus line 10. Further, the system controller 5 drives the CD-ROM drive 12 so that necessary map data and aerial photograph data are read from the CD-ROM disk DK and transferred to the buffer memory 15. More particularly, the system controller 5 searches the map display unit 53 in FIG. 2 related to the current position data, for example, unit 53A, and with referring to the data pointer 70 for aerial photograph (in FIG. 3), identifies the address of the storage area on the CD-ROM disk DK in which the aerial photograph data necessary for display is stored. Then, the system controller 5 transfers the readout aerial photograph data to the buffer memory 15 via the bus line 10 and the graphic controller 14. In this case, as aerial photograph data, data obtained by use of an image scanner which image-reads aerial photographs, may be preferably used. Accordingly, the data including a large quantity of information, can be rather easily obtained, while the data size is substantially same as that of the image data 61 of the map, so that the aerial photograph data can be easily stored in the CD-ROM disk DK.

Subsequently, the CPU 7 obtains the current position on the aerial photograph image, on the basis of the current position data and the map data, and overwrites the data indicating thus obtained current position on the aerial photograph data in the buffer memory 15, so as to form the display data. In order to obtain the relationship between the map data and the aerial photograph data, for example, the latitudes and longitudes of the upper left and lower right corners of a rectangular area formed by the aerial photograph data and a rectangular area formed by the map data, are referred to be matched with each other.

The graphic controller 14 sequentially reads display data from the buffer memory 15 in synchronism with drawing timing, and makes the data displayed on the display device 17 via the display controller 16.

Figure 6A:
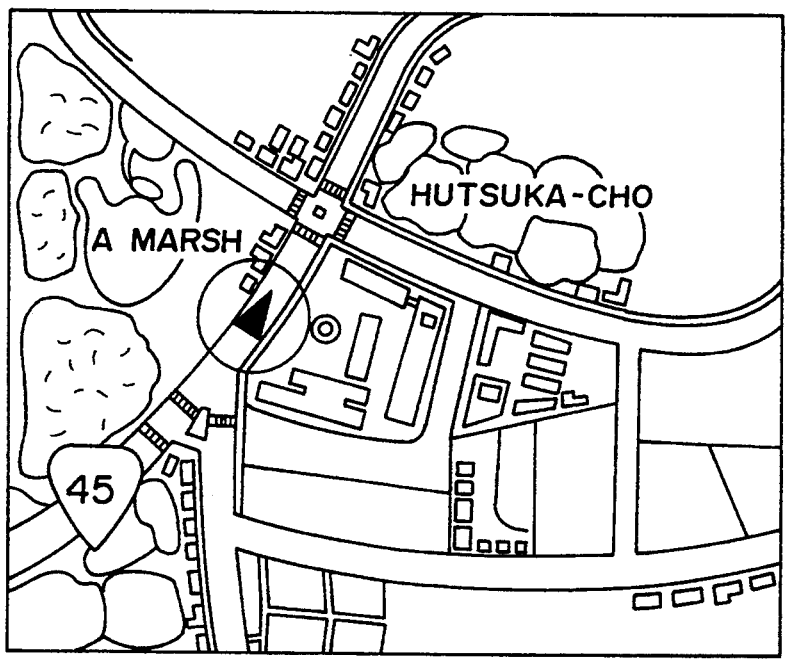
FIG. 6A is a diagram showing one display state in the present embodiment.
Figure 6B:
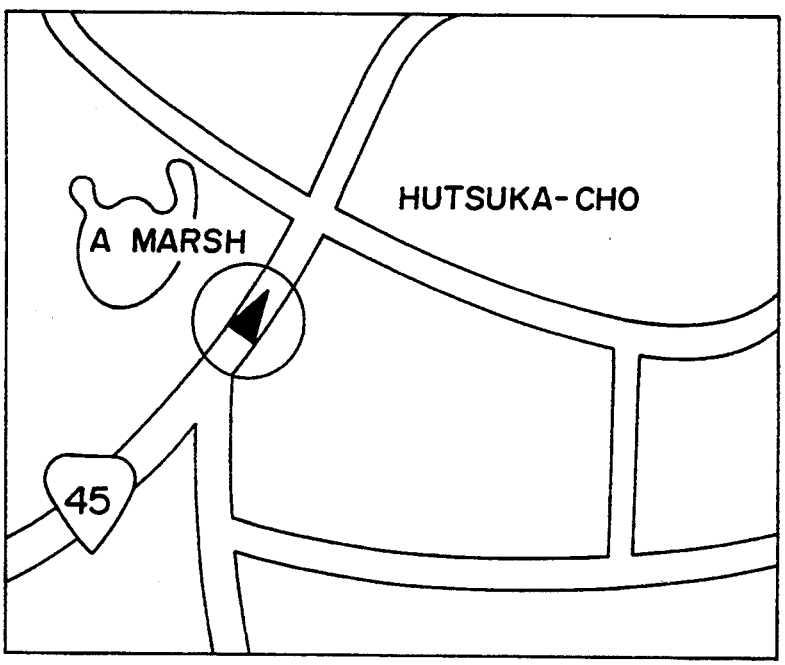
FIG. 6B is a diagram showing another display state in the present embodiment.

FIG. 6A shows a display image in which the current position of the movable body is indicated by a mark i.e. a black triangular mark, in the aerial photograph image, on the basis of the aerial photograph data. For the sake of comparison, another display image in which the current position of the movable body is indicated in the map image on the basis of the map data by the navigation system, is shown in FIG. 6B. In these figures, the leading end of the triangular mark indicates the traveling direction. The circle enclosing the current position mark indicates a predetermined distance (equal to, for example, 50 meters) from the current position.

As shown in FIGS. 6A and 6B, the actual conditions around the current position, can be easily understood by the display in which the current position mark is displayed in the aerial photograph image, compared with the display in which the current position mark is displayed in the map image, so that the navigation function is well enhanced since the user can easily understood the actual movement condition.

In the above explanation, the navigation system is adapted to display the current position on the aerial photograph image. However, in the navigation system constructed as in FIG. 1, the display is suitably switched to display the current position on the map image as shown in FIG. 6B from that on the aerial photograph image as shown in FIG. 6A, under selecting operation by the user by use of the input device 11 in FIG. 1, so that the navigation can be executed with a display to the taste of the user, case by case.

The present invention includes not only the aforementioned GPS systems but also self-sustaining type navigation systems, in which a two-dimensional displacement (vector quantity) of the movable body by using azimuth data from an azimuth sensor and speed data from a speed sensor, and adds the two-dimensional displacement to a reference point, are obtained.

The navigation system of the above mentioned embodiment is an on-vehicle type. However, the present invention includes navigation systems for movable bodies such as men, ships, and aeroplanes.

As described above, according to the embodiment of the present invention, since the conditions of buildings, agricultural field, etc. around the current position, can be displayed in the aerial photograph image, by comparing thus displayed aerial photograph image and the actual circumferences such as buildings and agricultural fields, around the current position, the recognition of the conditions around the current position can be visually and easily performed. Further, since the image data is used, which is formed by image-reading aerial photographs by use of an image scanner etc., a troublesome to form a complicated data can be essentially avoided, so that detailed image data can be rather easily formed without making the data size too large.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation system comprising:

position measuring means for measuring a current position of a movable body to which said navigation system is equipped;

storing means for storing aerial photograph data;

displaying means; and display controlling means coupled to said position measuring means, said storing means, and said displaying means, for obtaining a relative position of the measured current position with respect to the stored aerial photograph data including the measured current position, and controlling said displaying means to display a mark indicating the measured current position at the obtained relative position on an aerial photograph image on the basis of the measured current position and the stored aerial photograph data.

2. A navigation system as claimed in claim 1, wherein said storing means comprises a CD-ROM.

3. A navigation system as claimed in claim 1, wherein said storing means is adapted to store the aerial photograph data by image-reading an aerial photograph in advance.

4. A navigation system as claimed in claim 1, wherein said position measuring means comprises at least one of a GPS receiver, an azimuth sensor, an angular speed sensor and a travel distance sensor.

5. A navigation system as claimed in claim 1, further comprising input means coupled to said display controlling means for inputting instructions to said display controlling means.

6. A navigation system comprising:

position measuring means for measuring a current position of a movable body to which said navigation system is equipped;

storing means for storing aerial photograph data and map data;

displaying means; and display controlling means coupled to said position measuring means, said storing means, and said displaying means, for correlating the stored aerial photograph data with the stored map data, obtaining a relative position of the measured current position with respect to the stored map data, and controlling said displaying means to display a mark indicating the measured current position at the obtained relative position on an aerial photograph image on the basis of the measured current position and the correlated aerial photograph data.

7. A navigation system as claimed in claim 6, wherein said display controlling means controls said displaying means to display the mark indicating the measured current position on either one of the aerial photograph image and a map image based on the stored map data.

* * * * *